May 9, 1939. H. B. CARLSON 2,157,161
JUICE-EXPRESSING DEVICE
Filed Nov. 27, 1936 2 Sheets—Sheet 1
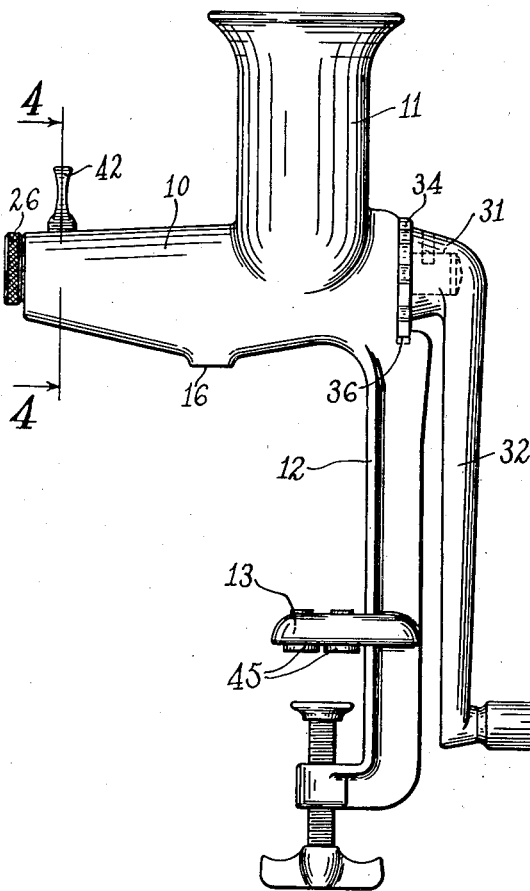
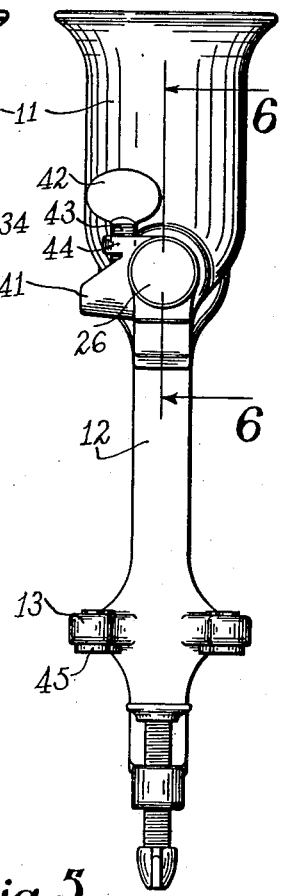
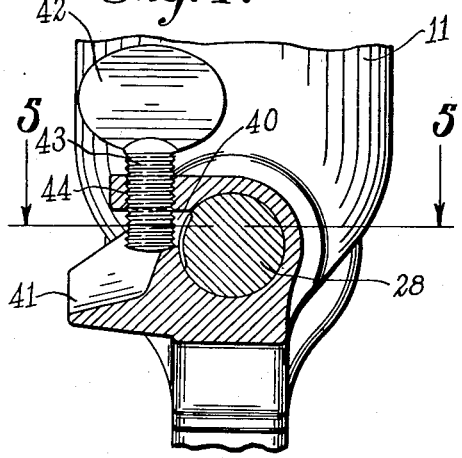
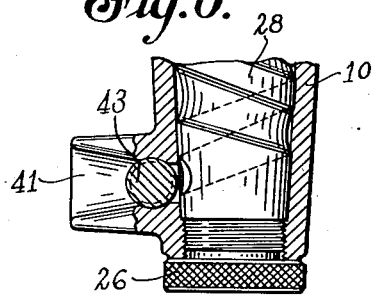
Inventor
Herman B. Carlson
By Rockwell␣Bartholow
Attorneys May 9, 1939.  H. B. CARLSON  2,157,161
JUICE-EXPRESSING DEVICE
Filed Nov. 27, 1936  2 Sheets-Sheet 2
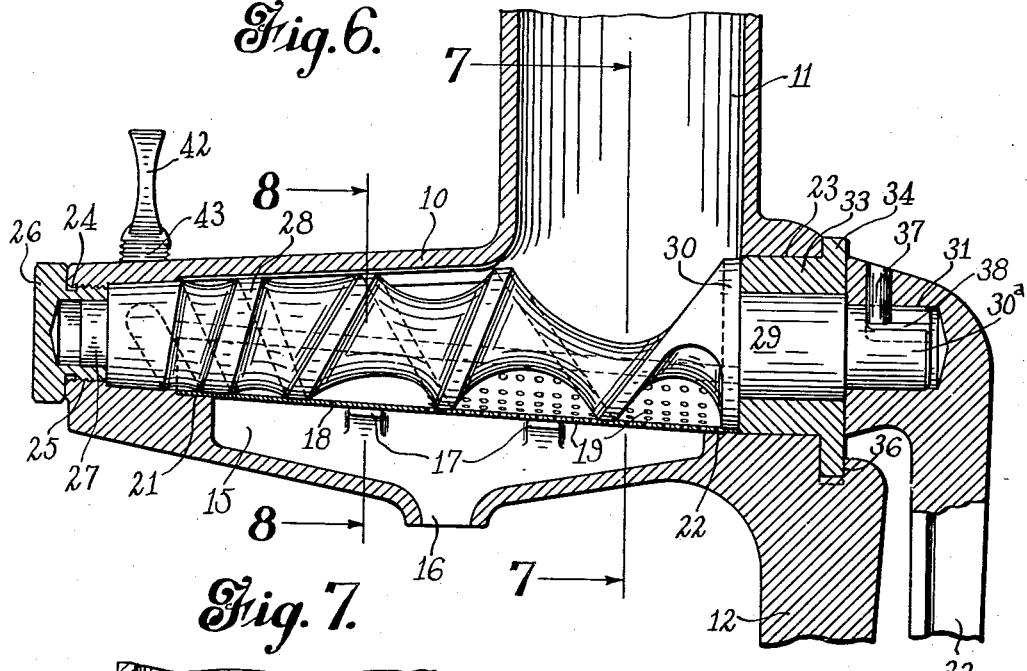
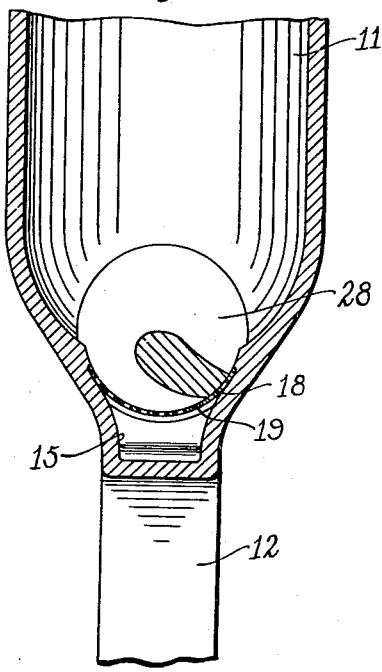
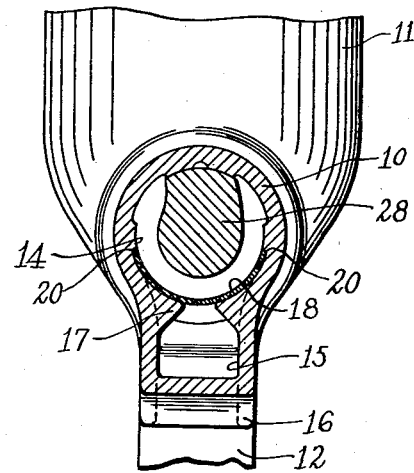
Inventor
Herman B. Carlson
By Rockwell-Bartholow
Attorneys Patented May 9, 1939

2,157,161

UNITED STATES PATENT OFFICE 2,157,161

JUICE-EXPRESSING DEVICE

Herman B. Carlson, New Haven, Conn., assignor to Sargent & Company, New Haven, Conn., a corporation of Connecticut Application November 27, 1936, Serial No. 112,945

2 Claims. (Cl. 100—48)

This invention relates to a juice expressing device, and more particularly to a machine for expressing the juice from fruits or vegetables or other food products, and to separate this juice from the pulp, discharging the juice at one place and the pulp at another in a continuous operation.

More specifically the improvements relate to an improved juice expressing machine which will strain the juice from the pulp during the passage of the material through the machine so that the raw material may be continuously fed to the hopper and the juice expressed therefrom without necessity for cleaning the device until the operation is completed.

One object of the invention is the improvement of the construction of devices of this character in order to provide a device which will be very simple in construction and consist of a relatively small number of parts.

Another object of the invention is to provide improved means for mounting and locking the screw or juice expressing roll in place.

A still further object of the invention is the provision of a device of the character described having a pulp outlet opening the size of which may be controlled as desired in order that, while the pulp is more or less continuously discharged from the machine, it will be discharged practically free of juice regardless of the material being passed through the device.

A still further object of the invention is the provision of an improved form of chamber for housing the juice expressing roll and screen.

A still further object of the invention is the provision of a device of the character described having a side outlet discharge opening for the pulp so that the chamber within which the juice expressing roll is housed is closed at both ends.

To these and other ends the invention consists in the novel features and combinations of parts to be hereinafter described and claimed.

In the drawings:

Fig. 1 is an elevational view of a juice expressing device embodying my invention;

Fig. 2 is a front end elevational view of the same;

Fig. 3 is an elevational view showing the end opposite that shown in Fig. 2;

Fig. 4 is an enlarged sectional view on line 4—4 of Fig. 1;

Fig. 5 is a partial sectional view on line 5—5 of Fig. 4;

Fig. 6 is an enlarged longitudinal sectional view of the device on line 6—6 of Fig. 3; and Figs. 7 and 8 are enlarged transverse sectional views on lines 7—7 and 8—8 respectively of Fig. 6.

To illustrate a preferred embodiment of my invention, I have shown a juice expressing device comprising a casing 10 having a hopper 11 disposed generally transversely to the longitudinal dimension of the casing. In the device illustrated, the casing is designed to be horizontally disposed and the hopper vertically disposed, the casing being provided with a standard 12 having at its lower end a clamp portion 13 by which it may be secured to a bench or table.

The chamber within the casing is, as shown in Figs. 6, 7 and 8, generally of circular shape in cross-section, and tapered toward the discharge end so that the casing becomes gradually smaller in cross-sectional size toward this end. While, as stated, the chamber or interior of the casing is provided with a generally circular portion 14, it is also provided at its lower side with a trough-like portion 15 having an opening 16 through which the juice is adapted to be discharged. At the upper side of the trough-like portion, projecting ribs 17 are provided upon the wall of the casing, these ribs being adapted to support the intermediate portion of a strainer 18 provided at its rear end with a number of perforations or openings 19 through which the juice is adapted to flow.

As shown more particularly in Fig. 8, this strainer is of arcuate form in cross-section and lies within the lower portion of the circular part 14 of the chamber, the upper edges of the screen abutting against shoulders 20 formed in the chamber wall. At its ends the screen rests upon the bottom portion of the chamber 14, as shown at 21 and 22, and it will be observed from inspection of Fig. 6, that the strainer is placed in an inclined position in the casing, with the lower end adjacent or below the hopper 11, so that the juice which is expressed principally at the outlet end of the device will flow rearwardly over the bottom of the strainer to reach the perforations 19. It will also be observed that the trough portion 15 below the strainer provides for the free outlet of the juice flowing thereinto from the strainer.

The casing 10 is provided with end openings 23 and 24, the latter being the smaller of the two and being provided with internal threads 25 to receive the complementary threads of a closure member or cap 26. This cap is hollow to provide for the reception therein of the reduced end 27 of the juice expressing roll or screw 28.

The screw 28 is provided with the usual helical ribs and depressions between the ribs, and it will be noted that these depressions are of less width and depth as the outlet end of the machine is approached, so that toward that end an increased pressing or squeezing operation is brought about. Adjacent the opening 23, the screw 28 is provided with a reduced bearing portion 29 extending outwardly from a shoulder 30 upon the screw, and beyond the bearing portion 29 is a further reduced end 30ª to be received in a socket 31 of the handle member 32.

The bearing portion 29 of the screw is designed to have a bearing within a collar 33 fitting snugly within the opening 23, this collar being provided with a peripheral flange 34 adjacent its outer end. At one portion the flange 34 is extended to provide a lug 35 designed, upon rotation of the flange and collar 33 to the proper position, to be received in a notch or recess 36 provided at the upper end of the standard 12.

In assembling the device, the screw 28 is inserted through the opening 23. The screw will readily enter this opening due to the fact that it is tapered toward its front end to correspond with the taper of the chamber within the casing 10, and it may be inserted until the reduced bearing portion 27 is seated within the cap or end closure 26. The collar 33 is then inserted in the opening 23 about the bearing portion 29 until the left-hand end of the collar, as shown in Fig. 6, abuts the shoulder 30 upon the screw. At this time the flange 34 of the screw also abuts the outer face of the casing, and the flange and collar may be given a slight rotation to engage the lug 35 within the notch 36.

The handle may then be placed upon the screw with the reduced portion 30ª being received within the socket 31. In order to connect the handle non-rotatably to the screw, the former is provided with a pin 37 which projects into the socket, and the reduced end 30ª is provided with a bayonet or L-shaped slot 38, which receives the end of the pin and permits it to enter the circumferential portion of the slot so as to provide against disengagement of the handle during the operation of the device.

At the outlet end the casing is provided with an opening 40 for the outlet of the pulp, and a small spout 41 into which the pulp flows from this opening. As shown, this opening is in the side of the casing, the end being completely closed by the cap 26. Means are provided for regulating the effective size of the opening 40, or even closing it entirely. This means comprises a wing screw 42 having a threaded portion 43, which is threadedly received in an opening in a lug 44 provided on the casing, the body of the screw entering the opening 40, as shown in Fig. 5, and completely closing this opening when the screw is screwed downwardly to its lowermost position, as shown in Fig. 4. The screw may be backed out to a sufficient extent to leave the discharge opening entirely free, or it may be set in any intermediate position to restrict the opening as much as desired so as to provide any desired effective discharge opening for the pulp up to the full size of the opening 40. It will be noted that the fluted portion of the screw does not extend to the extreme outlet end thereof, but terminates short of this end, leaving a solid portion at the end of the screw of circular cross-section, which substantially closes this end of the chamber adjacent the bearing cap 26. The fluted or grooved portion of the screw does, however, extend sufficiently far to communicate with the outlet opening 40. This arrangement insures against any of the pulp being squeezed into the end bearing of the screw, and also provides for very effective squeezing of the pulp, which can, of course, be regulated by regulating the effective size of the outlet opening. Also, the construction is very simple as compared with those devices wherein the outlet is provided in the extreme end of the chamber.

Rubber contacts 45 may be provided on the lower surface of the clamping member 13 so that the latter may grip the surface of a table or the like without any tendency to slip and without marring the same.

It will be apparent that, due to the formation of the screw 28, and due to the relatively small size of the pulp discharge opening 40, and particularly as the size of this opening may be restricted, the material fed into the machine will be subjected to considerable pressure, the pressure increasing as the outlet end of the machine is approached. The juice expressed from the material, which is cut and shredded as well as squeezed, will flow over the bottom of the strainer 18 and through the perforations 19 into the trough 15 and through the opening 16, where it may be caught in a suitable vessel placed under this opening.

It will also be obvious that the machine is of very simple construction. The screw may be removed by the removal of the collar 33. This is accomplished by rotating the collar slightly to disengage the lug 35 from the notch 36, and then giving the collar a longitudinal pull. After the screw is removed through the opening 23, the cap 26 is desired may be removed from the opening 24, and the device may then be readily cleaned, which is an important feature of any device of this kind for reasons of sanitation.

While I have shown and described a preferred embodiment of my invention, it will be understood that it is not to be limited to all of the details shown, but is capable of modification and variation within the spirit of the invention and within the scope of the appended claims.

What I claim is:

1. A juice expressing device having a casing provided with an internal generally horizontally disposed chamber, and a hopper opening downwardly into the chamber, the casing having generally circular bearing portions at its ends, and the lower trough-like portion communicating with the chamber between said bearing portions, a fluted screw rotatably mounted at its ends in the bearing portions of the chamber, a screen supported in the chamber below and in close proximity to the screw, a cap closing the outlet end of the chamber and having means to receive the end of the screw to provide a bearing thereover, said screw having a solid portion adjacent said cap closely fitting the bearing portion of the chamber, and said chamber having a side outlet opening adjacent the end of the screw with which the fluted portion of the screw communicates.

2. A juice expressing device having a casing provided with an internal generally horizontally disposed chamber, and a hopper opening downwardly into the chamber, the casing having generally circular bearing portions at its ends, and the lower trough-like portion communicating with the chamber between said bearing portions, a fluted screw rotatably mounted at its ends in the bearing portions of the chamber, a screen supported in the chamber below and in close proximity to the screw, a cap closing the outlet end of the chamber and having means to receive the end of the screw to provide a bearing thereover, said screw having a solid portion adjacent said cap closely fitting the bearing portion of the chamber, said chamber having a side outlet opening adjacent the end of the screw with which the fluted portion of the screw communicates, and means for regulating the effective size of said opening.

HERMAN B. CARLSON.